United States Patent [19]
McHorse

[11] Patent Number: 5,947,520
[45] Date of Patent: Sep. 7, 1999

[54] VEHICLE WITH SACRIFICIAL FAIRING

[75] Inventor: James Vincent McHorse, Portland, Oreg.

[73] Assignee: Freightliner Corporation, Portland, Oreg.

[21] Appl. No.: 08/671,445

[22] Filed: Jun. 27, 1996

[51] Int. Cl.⁶ .................................................. B62D 25/18
[52] U.S. Cl. .............................. 280/848; 293/1; 280/154; 280/770; 296/180.2; 296/190.01; 296/198
[58] Field of Search .................................. 280/848, 851, 280/154, 159, 162, 770; 293/1; 296/180.1, 180.2, 190, 198

[56] References Cited

U.S. PATENT DOCUMENTS

| D. 291,872 | 9/1987 | Simons et al. | 296/180.2 |
|---|---|---|---|
| 4,227,718 | 10/1980 | Durben | 293/1 |
| 4,925,235 | 5/1990 | Fingerle | 296/180.2 |
| 4,932,716 | 6/1990 | Marlowe et al. | 296/180.2 |
| 5,238,268 | 8/1993 | Logan | 280/848 |

FOREIGN PATENT DOCUMENTS

| 696782 | 10/1965 | Italy | 280/851 |
|---|---|---|---|
| 62-23876 | 1/1987 | Japan | 296/198 |

*Primary Examiner*—Eric D. Culbreth
*Attorney, Agent, or Firm*—Klarquist Sparkman Campbell Leigh & Whinston, LLP

[57] ABSTRACT

A sacrificial fairing is an elongated, arcuate trough-shaped panel member having a leg which detachably mounts to a rear edge of an elongated side fairing of a truck between the side fairing and a wheel well. The sacrificial fairing extends only partially around the wheel well. The sacrificial fairing can be easily detached from the side fairing. As a result, the sacrificial fairing can be easily replaced in case of damage from rocks, debris, chains, or the like.

19 Claims, 3 Drawing Sheets

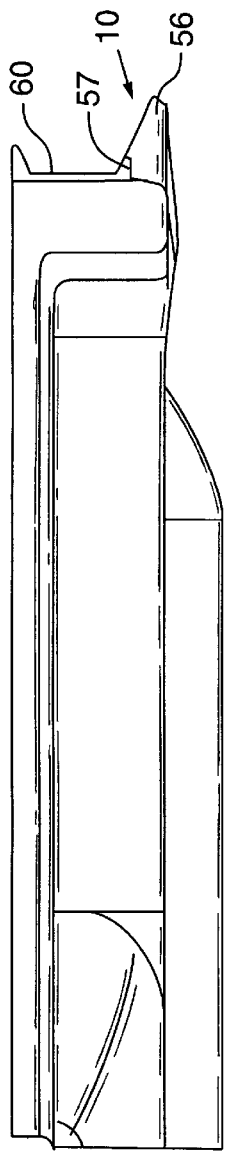
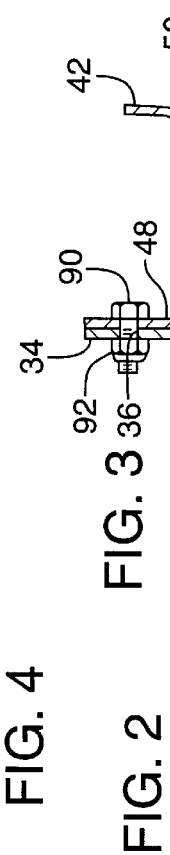
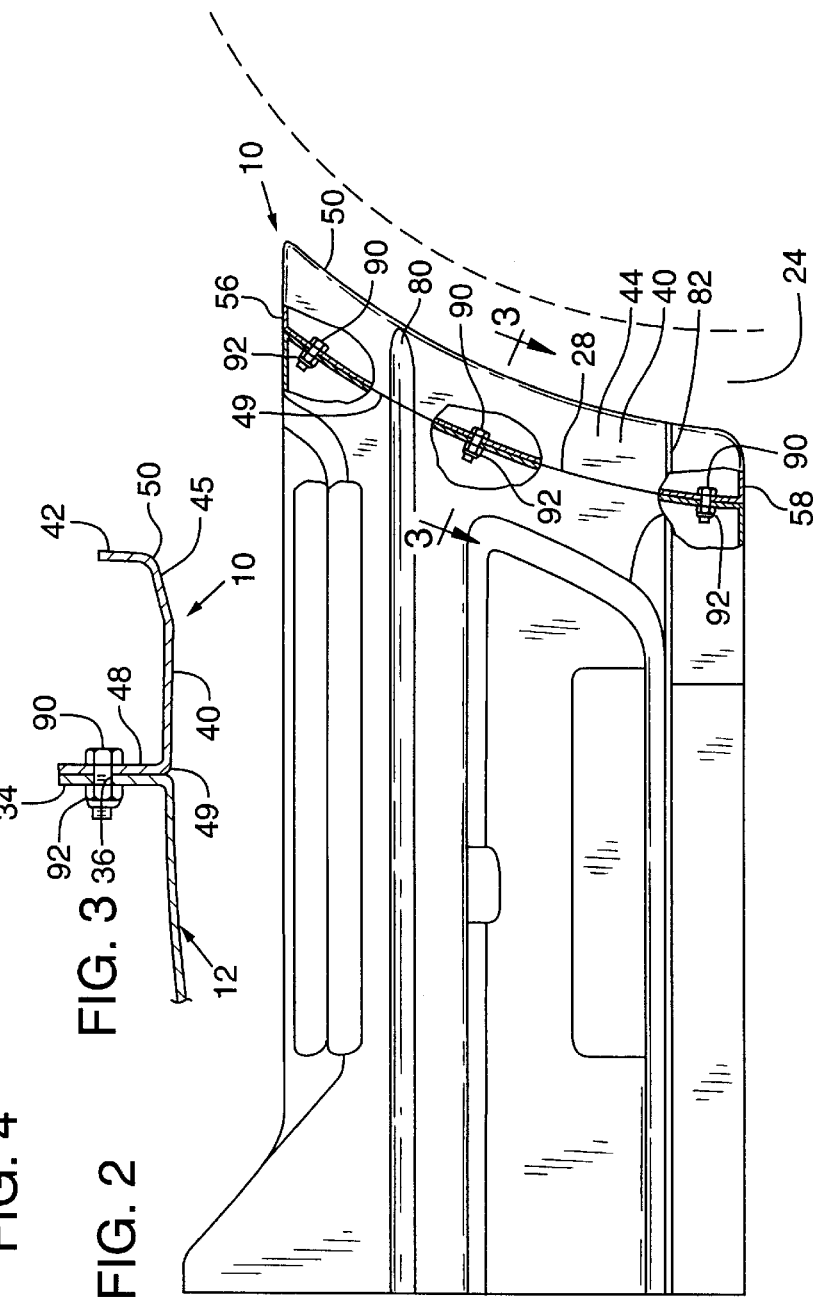
FIG. 4
FIG. 3
FIG. 2

VEHICLE WITH SACRIFICIAL FAIRING

FIELD OF THE INVENTION

This invention relates to a sacrificial fairing for a vehicle and to vehicles, in particular trucks, with such sacrificial fairings.

BACKGROUND OF THE INVENTION

A vehicle, such as a truck, has side panels, or side fairings, that cover the frame of the vehicle and extend along the side of the vehicle. The side fairings generally terminate near a substantially semi-circular opening, or a wheel well. Each wheel well has a wheel therein.

As the wheels rotate, they often spit up rocks or other debris, which hit the portion of the side fairing that surrounds the wheel well. In addition, when chains are used on the tires for traction, the chains may break or come loose and strike the portion of the side fairing surrounding the wheel well.

The impact from the rocks, debris, or chains, often breaks, dents or disfigures the portion of the side fairing surrounding the wheel well. Also, the damage gives the side fairing, and therefore the overall vehicle, an unattractive appearance.

To replace the damaged portion of the side fairing, a major side fairing section or, in some cases, the entire side fairing typically must be removed from the vehicle and replaced. Replacing the entire side fairing is both expensive and time-consuming.

Therefore, a need exists for an improved fairing directed toward overcoming these and other problems of the prior art.

SUMMARY OF THE INVENTION

Accordingly, it is an object of the present invention to provide a sacrificial fairing for a vehicle and a vehicle, such as a truck, with a sacrificial fairing.

In accordance with one aspect of the present invention, a sacrificial fairing is mounted to a vehicle having a side with a side fairing extending along a portion thereof and a wheel well at the end of the side fairing, the side fairing being arcuately shaped to partially extend around the wheel well and being attachable to and detachable from the side fairing so that the sacrificial fairing can be readily replaced when damaged.

As another aspect of this invention, the sacrificial fairing is an elongated panel member with first and second legs, the panel member and first and second legs having a U-shaped cross-section, and the first leg comprising a side fairing mounting flange for coupling to the vehicle side fairing.

As yet another aspect of this invention, the sacrificial fairing is detachably mounted in a position between the wheel well and the side fairing so that the sacrificial fairing protects the side fairing from damage that might be generated in the wheel well and allows the sacrificial fairing to be removed in case of damage.

As a further aspect of this invention, the sacrificial fairing has an exterior surface that is preferably flush with the exterior surface of the adjacent side fairing.

More specifically, the sacrificial fairing in one embodiment of the invention has a body with an elongated, arcuate side panel portion having an exterior surface. The body also has an arcuate, longitudinal edge flange projecting from the side panel portion inwardly into the wheel well and away from the exterior surface. This flange portion defines at least a portion of the wheel well when the sacrificial fairing is attached to the side fairing. The body also has a mounting portion that projects from the side panel portion and away from the exterior surface.

As still another aspect of this invention, the side fairing has an extension mounting surface, which is preferably curved to generally follow the curvature of a wheel in the wheel well, and the mounting portion of the sacrificial fairing is shaped to abut the extension mounting surface on the side fairing to accommodate mounting thereto.

The present invention is directed toward the above objects and advantages individually as well as collectively. These and other objects, advantages, and features of the invention will become apparent with reference to the following description and drawings.

BRIEF DESCRIPTION OF THE DRAWINGS

FIG. 2 is a partially broken away side elevational view of a vehicle side fairing with the sacrificial fairing of FIG. 1 attached thereon.

FIG. 3 is a sectional view of a portion of the side fairing and the sacrificial fairing of FIG. 2, taken along line 3—3 of FIG. 2.

FIG. 4 is a top plan view of the side fairing and sacrificial fairing of FIG. 2.

DESCRIPTION OF A PREFERRED EMBODIMENT

Figure 1:
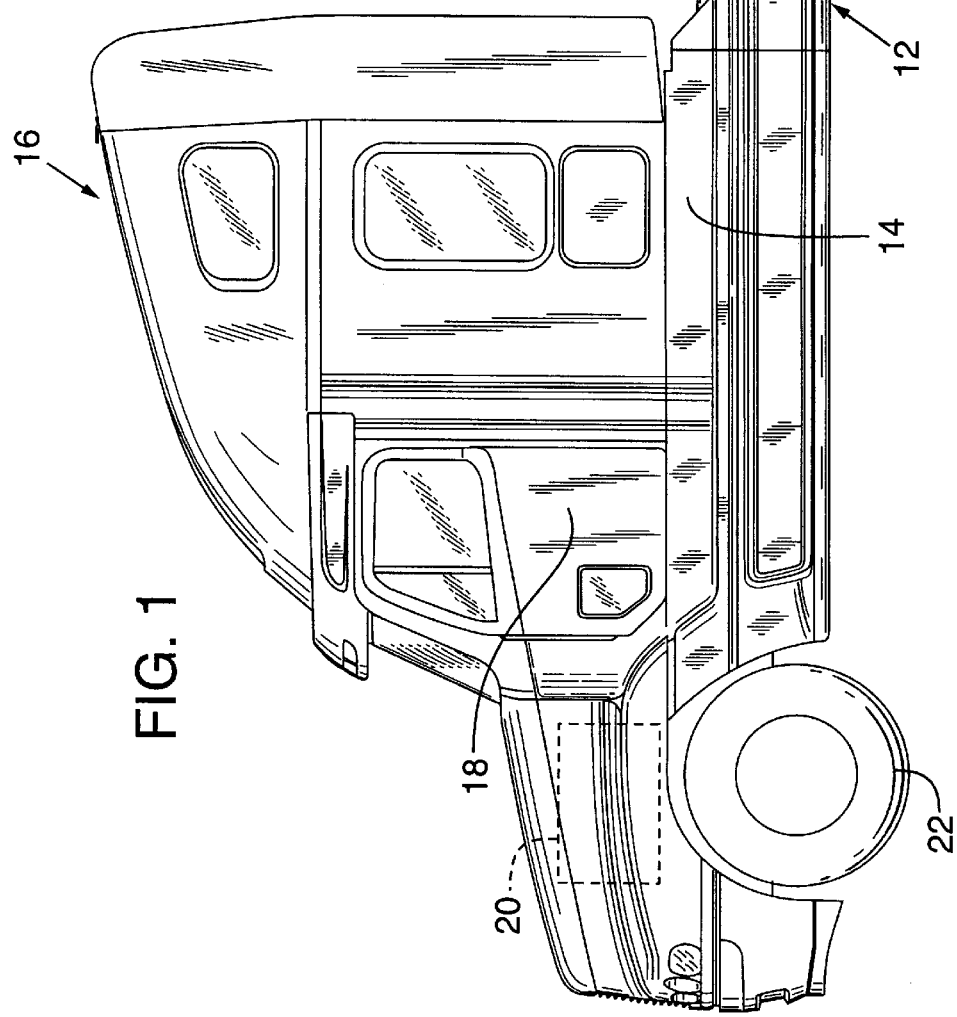
FIG. 1 is a side elevational view of a vehicle, in this case a truck, with a sacrificial fairing of one embodiment of the invention.
Figure 6:
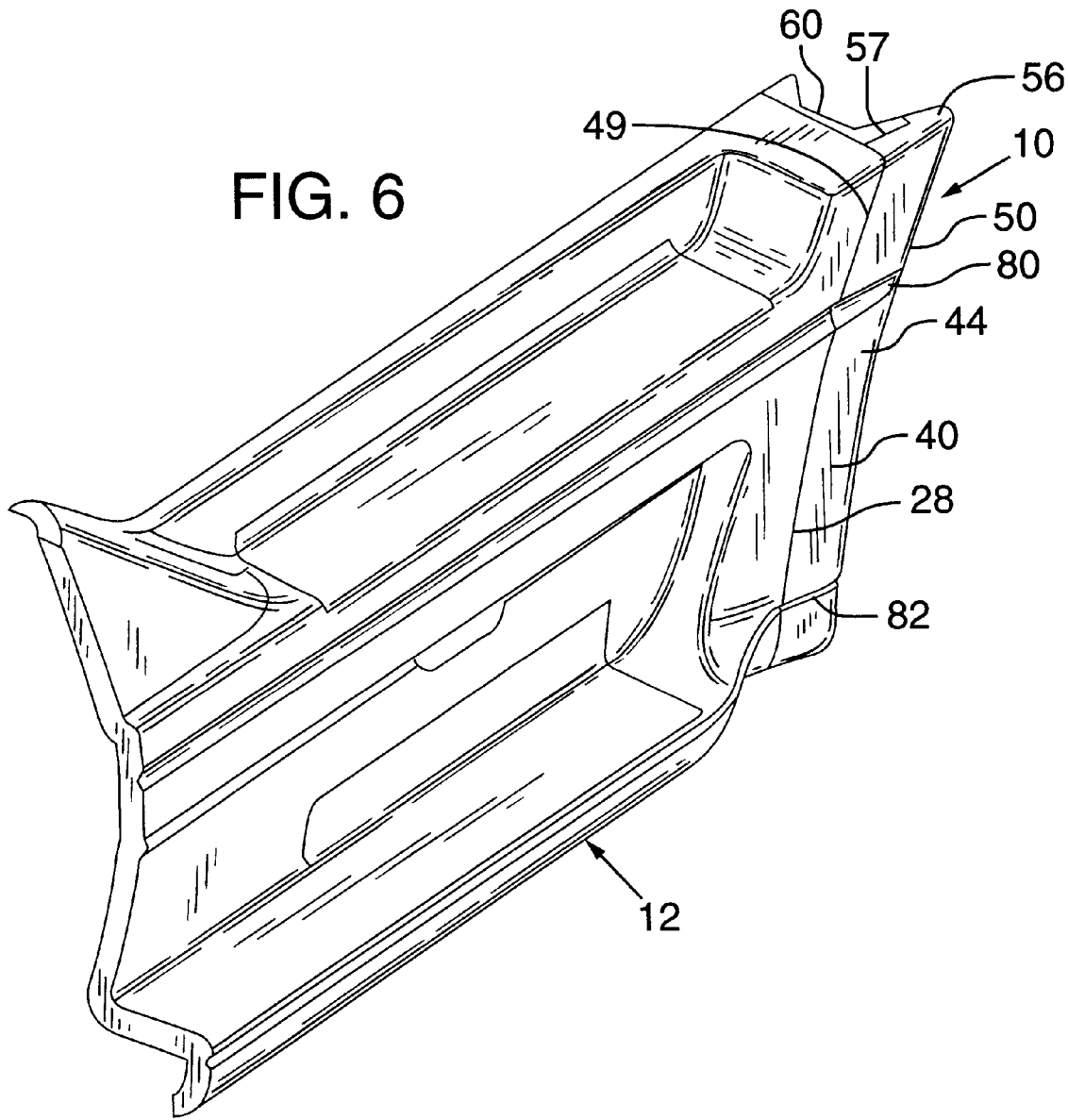
FIG. 6 is a perspective view of the combined side fairing and sacrificial fairing of FIG. 2.

One form of a sacrificial fairing in accordance with the present invention is shown in FIG. 1. In this figure, the sacrificial fairing 10, or side fairing extension, is attached to a side fairing section 12 on a body 14 of a truck 16. The truck 16 has a cab 18, an engine 20, and front and rear wheels 22, 23 which are drivenly coupled to the engine and sit within wheel wells, such as 24 for the forwardmost rear wheel 23. The sacrificial fairing 10 is detachably mounted to the end of the side fairing section 12 adjacent the wheel well 24 and can be easily attached to and detached from the side fairing 12, as indicated in FIG. 2.

Referring to FIG. 1, the illustrated side fairing 12 fits over a frame (not shown) of the truck 16. The illustrated side fairing has a forward portion extending beneath the cab 18 and the rear section 12 located behind and beneath the cab 18 of the truck 16. The side fairing is formed of a durable material, such as sheet metal, but most preferably is molded of a plastic or fiberglass material, such as "GTX 902" material from General Electric company.

The side fairing 12 has a generally planar, exterior surface with styling lines molded therein. The rear edge 28 of the side fairing 12 is curved to generally follow the curvature of the adjacent perimeter of the forwardmost rear wheel 23. As a result, the top edge 30 of the side fairing 12 is longer than the bottom edge 32 of the side fairing 12. The curvature of the rear edge 28 of the side fairing 12 thus mimics the shape of the wheel 22 and, in the absence of the sacrificial fairing 10, would bound and define a portion of the wheel well 24. The illustrated side fairing 12 has two longitudinal styling lines 33 on its exterior surface.

The rear edge 28 of the side fairing 12 has an extension mounting surface or flange 34 projecting essentially perpendicularly inwardly into the wheel well 24 from the exterior surface of the side fairing 12, as best seen in FIG. 3. The extension mounting surface 34 follows the curvature of the rear edge 28 of the side fairing 12. The flange 34 has three essentially equally, longitudinally spaced apart fastener receiving holes 36 for use in mounting the sacrificial fairing 10 thereto.

The sacrificial fairing 10 is detachably mounted to the mounting flange 34 on the side fairing 12 to thereby act as a rearward extension of the side fairing 12 and to define a portion of the wheel well 24.

Figure 5:
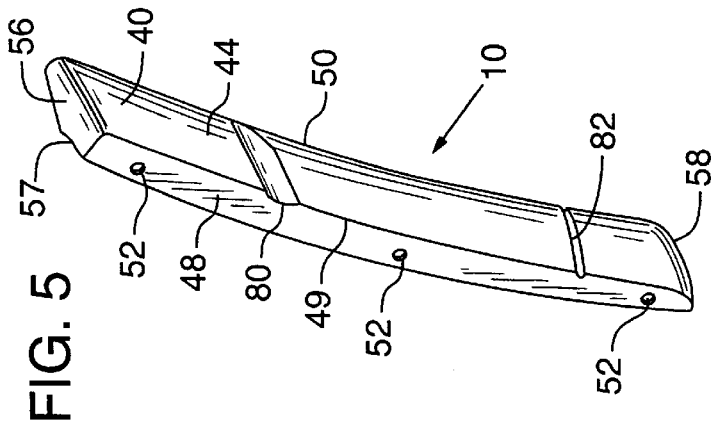
FIG. 5 is a front perspective view of the sacrificial fairing of FIG. 1.

As best seen in FIGS. 3 and 5, the sacrificial fairing 10 of the illustrated embodiment is preferably a monolithic component with a generally trough-shaped body. The body comprises an elongated, arcuate panel member. The body has an elongated, arcuate side panel or base portion 40, a longitudinal edge flange 42, and a longitudinal mounting flange 48.

The side panel portion 40 curves in the direction along the length of the truck 16 and has an exterior surface 44 that is exposed at the exterior of the truck 16. The illustrated side panel 40 is generally planar. As best seen in FIG. 3, the side panel 40 may have a rear edge portion 45 angled slightly inwardly, such as at a 12° angle, near the rear edge flange 42 of the side panel 40. The illustrated side panel 40 is preferably narrow, for example approximately 100 mm (about 4 inches) wide, approximately 650 mm (about 26 inches) high, and curves through about a 70° arc.

The side panel 40 has a first longitudinal edge 49 and a second longitudinal edge 50. Each edge 49, 50 curves and follows an arc through approximately 70°. The first edge 49 mimics or follows the curvature of the rear end 28 of the side fairing 12. The second edge 50 follows a similar arc, is substantially parallel to the first edge and partially defines the wheel well 24.

The edge flange 42 projects inwardly into the wheel well 24 along the second edge 50 and extends substantially perpendicularly away from the exterior surface 44 of the side panel 40. The edge flange 42, in combination with the second edge 50, defines a portion of the wheel well 24.

The mounting flange 48 is used to mount the sacrificial fairing 10 to the mounting surface 34 of the side fairing 12. The mounting flange 48 projects inwardly into the wheel well 24 along the first edge 49 of the side panel 40. The flange 48, in the illustrated form, extends substantially perpendicularly away from the exterior surface of the side panel 40. The flange 48 extends or protrudes into the wheel well a greater distance than the edge flange 42. The mounting flange 48 has three fastener receiving holes 52, spaced for alignment with the holes 36 in the mounting surface 34 of the side fairing 12 when the sacrificial fairing 10 is mounted to the mounting surface 34 of the side fairing 12. The fastener receiving holes 36, 52, located so that the exterior surface 44 of the sacrificial fairing 10, is preferably flush with the exterior surface of the side fairing 12.

As shown in FIG. 3, in cross-section, the combined side panel 40, edge flange 42, and mounting flange 48 appear U-shaped, with the base of the "U" being the side panel 40, the first leg being the mounting flange 48, and the second leg being the edge flange 42.

The top and bottom ends of the sacrificial fairing 10 curve inwardly (see FIG. 5) from the exterior surface 44 of the side panel 40 to form a top flange 56 and a bottom flange 58. The top flange 56 projects substantially perpendicularly inwardly from the upper edge of the exterior surface 44 of the side panel 40. The bottom flange 58 also projects substantially perpendicularly inwardly from the bottom edge of the surface 44. The flanges 42, 48, 56 and 58 form a continuous inwardly projecting reinforcing border about the periphery of the sacrificial fairing 10. As shown in FIG. 4, the illustrated top flange 56 has a recessed or truncated edge 57 near the mounting flange 48 that is sized and shaped to accommodate a handle 60, which attaches to the side fairing 12 to assist in removal of the side fairing.

The illustrated sacrificial fairing 10 is preferably, although not necessarily, formed by injection molding. The sacrificial fairing 10 preferably is made from a durable material, but one that is less durable than the material of the side fairing 12. A thermoplastic material, such as acrylonitrile-butadiene-styrene, is specifically preferred. In particular, Magnum ABS 275, available from Dow Plastics has worked well.

Although it may be varied, the side panel 40, edge flange 42, mounting flange 48, and top and bottom flanges 56 and 58 in the illustrated form have a thickness of about three millimeters.

The side panel 40 of the sacrificial fairing 10 has an upper styling line 80 and a lower styling line 82. The upper styling line 80 extends transversely across the side panel 40 approximately 150 mm below the top edge of the side panel 40, and the lower styling line 82 also extends transversely across the exterior surface 44 of the side panel 40, approximately 100 mm above the bottom edge of the side panel 40. The upper styling line 80 is an arcuately-shaped indentation, and the lower styling line 82 is a V-shaped indentation. When the sacrificial fairing 10 is mounted to the side fairing 12, the upper and lower styling lines 80, 82 align with styling lines 33 on the side fairing 12 to give the side fairing and sacrificial fairing an aesthetically pleasing appearance.

To assemble the sacrificial fairing 10 to the side fairing 12, the mounting flange 48 of the sacrificial fairing is abutted against the mounting surface 34 of the side fairing 12. In addition, the holes 52 in the mounting flange 48 are aligned with the holes 36 in the mounting surface 34. In this position, the exterior surface 44 of the illustrated sacrificial fairing 10 is flush with the exterior surface of the side fairing 12. The sacrificial fairing 10 is then fastened to the side fairing 12 with removable fasteners, such as bolts 90 and nuts 92 extending through holes 36 and 52.

The sacrificial fairing 10 can be quickly and easily detached from the side fairing 12 by removing the bolts 90 and nuts 92. Thus, if the wheel kicks up rocks or debris or tire chains become loose or break, the sacrificial fairing is in position to sustain the damage and in most cases shield the more expensive side fairing 12 from harm. The sacrificial fairing, if damaged, can easily be replaced.

This description illustrates one embodiment of the present invention and should not be construed to limit the scope of the invention in any way. Other modifications and variations may be made to the assembly described without departing from the invention as defined by the appended claims and their equivalents.

The invention claimed is:

1. In a vehicle having a side, a wheel well with a wheel therein, a longitudinal centerline and a side fairing extending along a portion of the side of the vehicle and terminating at a rear edge near the wheel well, a sacrificial fairing comprising:

an elongated arcuate panel member shaped to partially extend around the wheel well; and the elongated panel member having a base and first and second legs projecting inwardly from the base toward the longitudinal centerline of the vehicle, the first leg for detachably mounting to the side fairing, the second leg substantially opposing the first leg and spaced therefrom so that when the elongated panel member is mounted to the side fairing, the second leg is spaced from the side fairing.

2. The sacrificial fairing of claim 1 in which the elongated panel member has a generally U-shaped cross section.

3. The sacrificial fairing of claim 2 in which the base has a width no greater than about four inches.

4. The sacrificial fairing of claim 1 in which the elongated panel member is trough-shaped.

5. The sacrificial fairing of claim 1 in which the elongated panel member is detachably mounted to the side fairing with at least one fastener.

6. The sacrificial fairing of claim 1 in which the elongated panel member is of a thermoplastic material.

7. The sacrificial fairing of claim 6 in which the elongated panel member is of acrylonitrile-butadiene-styrene.

8. The sacrificial fairing of claim 1 in which the wheel well has a front upper quadrant and the arcuate member extends around approximately 70° of the front upper quadrant of the wheel well.

9. The sacrificial fairing of claim 1 in which the base of the sacrificial fairing has an exterior surface, and wherein the exterior surface of the base is adapted to be flush with the side fairing.

10. The sacrificial fairing of claim 1 in which the side fairing of the vehicle includes an indentation creating a styling line and the elongated panel member includes an exterior surface with an indentation aligned with the styling line.

11. The sacrificial fairing of claim 1 in which the base is substantially upright and the first and second legs are spaced apart laterally from one another so that when the elongated panel member is mounted to the side fairing, the second leg is spaced laterally from the side fairing.

12. In a vehicle having a side, a wheel well with a wheel therein, a longitudinal centerline and a side fairing extending along a portion of the side of the vehicle and terminating at a rear edge near the wheel well, a sacrificial fairing comprising:

an elongated arcuate panel member shaped to partially extend around the wheel well; and the elongated panel member having a base and first and second legs projecting inwardly from the base toward the longitudinal centerline of the vehicle, the first leg for detachably mounting to the side fairing, the second leg substantially opposing the first leg and spaced therefrom so that when the elongated panel member is mounted to the side fairing, the second leg is spaced from the side fairing; and the elongated panel member being detachably mounted to the rear edge of the side fairing in a position between the wheel well and the side fairing so as to protect the rear edge of the side fairing from damage and so as to allow removal of the panel member in case of damage, whereby risk of damage to the entire side fairing is reduced by the sacrificial fairing.

13. In a truck including a side having a wheel well with a wheel therein, a side fairing assembly comprising:

a side fairing extending along at least a portion of the side of the truck, the side fairing including an extension mounting surface; and a side fairing extension being detachably mounted to the extension mounting surface of the side fairing to form an extension of the side fairing, the side fairing extension being removable from the side fairing to allow replacement of the side fairing extension in case of damage, the fairing extension having a body with an elongated arcuate side panel portion having an exterior surface, the body having at least one arcuate, longitudinal edge flange, projecting from the side panel portion and inwardly into the wheel well and away from the exterior surface, and the longitudinal edge flange defining at least a portion of the wheel well when the fairing extension is attached to the side fairing; and the body having a mounting portion that projects from the side panel portion and inwardly into the wheel well and away from the exterior surface, the mounting portion being shaped to abut the extension mounting surface of the side fairing for detachable mounting thereto; and the fairing extension being positionable between the side fairing and the wheel well so as to protect the side fairing from damage.

14. The side fairing assembly of claim 13 in which the fairing extension is of an injection molded thermoplastic material.

15. The side fairing assembly of claim 14 in which the fairing extension is made from acrylonitrile-butadiene-styrene.

16. The side fairing assembly of claim 13 in which the side fairing extension is trough-shaped.

17. A truck comprising an engine, wheels drivenly coupled to the engine, a cab, and a side fairing assembly according to claim 13.

18. In a truck having a rear wheel well with a wheel therein and a side fairing extending along a portion of the length of the truck, the side fairing having an exterior and a rear mounting edge that terminates adjacent to and forwardly of a rear wheel of the truck, the rear mounting edge curving generally to follow the curvature of the rear wheel and extending inwardly into the wheel well, a sacrificial fairing extension comprising a trough-shaped member detachably mounted to the rear mounting edge of the side fairing, the trough-shaped member including:

an elongated face panel portion having an exterior face and first and second longitudinal, arcuate edges shaped to form transverse arcs and in which the first arcuate edge follows the curvature of the rear mounting edge of the side fairing, and the second arcuate edge defines at least a portion of the wheel well;

a first side flange extending inwardly into the wheel well from the first arcuate edge of the face panel and thereby also following the curvature of the rear mounting edge of the side fairing, the first side flange bolting to the rear mounting edge of the side fairing and thereby being removable therefrom;

a second side flange extending inwardly from the second arcuate edge of the face panel; whereby the trough-shaped member protects at least the rear edge portion of the side fairing from damage arising from impact and is readily replaceable in case of damage; and top and bottom flanges which join the first and second side flanges to form a continuous inwardly projecting border opposite to the exterior face, and wherein the first side flange projects inwardly a greater distance than the second side flange.

19. A truck with a sacrificial fairing according to claim 18 in which the exterior face is angled inwardly along the second arcuate edge.

\* \* \* \* \*